United States Patent [19]

Tournois

[11] 4,403,311
[45] Sep. 6, 1983

[54] ACOUSTIC IMAGING SYSTEM

[75] Inventor: Pierre Tournois, Paris, France

[73] Assignee: Thomson-CSF, Paris, France

[21] Appl. No.: 244,715

[22] Filed: Mar. 17, 1981

[30] Foreign Application Priority Data

Mar. 21, 1980 [FR] France .................. 80 06404

[51] Int. Cl.$^3$ ............................................. G01S 15/89
[52] U.S. Cl. .................................... 367/11; 367/88
[58] Field of Search ............ 367/7, 8, 11, 88, 103, 367/105; 364/821, 827; 343/5 NQ, 17.2 PC

[56] References Cited

U.S. PATENT DOCUMENTS

| | | | |
|---|---|---|---|
| 3,680,105 | 7/1972 | Goldstone | 343/5 NQ |
| 3,935,439 | 1/1976 | Buss et al. | 364/821 |
| 4,049,958 | 9/1977 | Hartmann | 364/821 X |
| 4,119,940 | 10/1978 | Keating et al. | 367/11 X |
| 4,167,737 | 9/1979 | Freedman | 343/17.2 PC |

OTHER PUBLICATIONS

Jack et al., *Electronics Letters*, vol. 13, No. 3, pp. 65-66, Feb. 1977.
Grant et al., *Ultrasonics Symposium Proc.*, 1977, pp. 957-960.
Jack et al., 1978 *Ultrasonics Symposium Proc.*, Feb. 1978, pp. 533-537.

*Primary Examiner*—Richard A. Farley
*Attorney, Agent, or Firm*—Oblon, Fisher, Spivak, McClelland & Maier

[57] ABSTRACT

An acoustic imaging system enabling images in two dimensions to be obtained. The system contains an array formed by M transmitter transducers $E_1, E_2, \ldots E_M$, supplying separable coded signals of the same frequency and a reception array with at least one line of hydrophones, $H_1, H_2, \ldots H_N$. The signals such as $h_i$ received by each of the hydrophones are applied to processing circuits such as $D_{ik}$ supplying signals $x_{ik}$ and $y_{ik}$, which are multiplexed in circuits MX and MY in a given order, placed on a carrier and applied to an analog Fourier transform device with filters dispersive to acoustic waves. After detection, the system supplies a line of images.

4 Claims, 13 Drawing Figures

ACOUSTIC IMAGING SYSTEM

BACKGROUND OF THE INVENTION

1. Field of the Invention

The system in accordance with the invention is an acoustic imaging system which enables images in two dimensions to be obtained. In particular, such a system can be used to display underwater objects.

2. Description of the Prior Art

Acoustic imaging finds many applications in the fields of medecine, non-destructive testing and also the underwater acoustic field. Generally these imaging systems transmit acoustic energy in the form of ultrasonic waves which fill the surrounding space. This energy is returned by reflection to reception devices which, after various processes, supply an image which is similar in appearance to an optical image.

It is known that, as reception means, an array formed of transducers supplying electrical signals can be used, these signals being processed to obtain a signal representing the acoustic energy coming from one direction, this signal then being detected before being transmitted to a display device.

It is also known that the signals coming from transducers spaced periodically in a linear array can be processed by performing the Fourier transform of a signal formed by all the signals in succession from the transducers taken in a very small interval of time compared with the reciprocal of the apparatus pass band. However, this method of processing is only possible if the frequency band of the signal transmitted is small compared with the high frequency carrier.

Finally, it is known that the Fourier transform of an analog signal can be produced by means of filters which are dispersive to elastic waves, such a device being known as a "chirp transform".

The image system proposed contains in particular a flat reception array consisting of periodically spaced transducers in which processing of the signals coming from the transducers is done by performing the Fourier transform of means of elastic wave dispersive filters for surface or volume waves.

In all imaging systems, the spatial resolution, i.e. the distance for which two points in the image plane are separable, is determined by the dimension of the reception array expressed in wavelengths.

A technique, which is often used in the radar field, consists in synthesizing a bigger array dimension by using the movement of the transmitter and reception array with respect to the object.

Another technique, described in U.S. Pat. No. 4,119,940 by Keating, consists in using several transmitters separated in space whose positions are known with respect to the reception array, each transmitter supplying a coded signal so that it can then be separated out at the level of each transducer in the reception array. The signals are then converted into digital samples to be processed by a computer which reconstructs the image by carrying out in succession the focussing and Fourier transform operations. This system, which uses an acoustic holography technique, as the disadvantage of imposing a low limit on the time required to obtain an image because of the time taken for the calculations in the computer even when the best algorithms of the fast Fourier transform, called F.F.T, are used, whereas the display of mobile objects moving rapidly requires that this time be reduced to obtain clear images.

The system in accordance with the invention enables an image of the same dimensions to be obtained in a shorter time by the use of analog devices.

In underwater acoustics, apparatuses for sonar imaging of sea bottoms of the side-scan or frontal types have long been used. They contain a reception array and a transmission array and the intention is to supply an image of the sea bottom in order to detect and identify objects which may be located there (mines for example). In these systems, the signals coming from the reception array are spatially processed to give incident beams which are oblique with respect to the bottom. The image supplied at each instant consists of lines formed by image "points" corresponding to the directions of the beams formed, each line corresponding to a distance.

To improve the range resolution, the acoustic signal is transmitted with a band B and an image line must be obtained within a time interval less than or equal to the reciprocal of this band. Hence the advantage in using fast technologies. For this purpose, in accordance with prior art, the beam formation is obtained in analog fashion by using delay lines with multiple connections, placed behind each reception array transducer, and a set of adders. The signal corresponding to a beam is obtained at the output of each adder. Because of the resolution several dozen beams are formed and the volume of electronic circuitry is very large.

BRIEF SUMMARY OF THE INVENTION

The system in accordance with the invention, which is applied to apparatuses of the side-scan or frontal sonar type, corrects this disadvantage and enables the resolution, i.e. the number of beams formed, to be increased without increasing the array dimension. Also, the speed at which image lines are obtained is not reduced although the volume of circuitry is much reduced.

It is an acoustic imaging system containing a transmission array formed by M transducers in which $M > 1$, each of these transmitter transducers being connected to an electrical energizing circuit, a reception array formed by at least one line of hydrophones, the signals supplied by each hydrophone being applied to M circuits, each of these circuits supplying the M signals received by a hydrophone which are generated by the M transmitters, and means enabling the signals received by each line of hydrophones from each transmitter to be multiplexed sequentially in time, characterized wherein the system also contains means for obtaining in analog fashion the Fourier transform of these multiplexed signals by means of elastic wave dispersive filters for surface or volume waves, the signal supplied by the Fourier transform device giving an image line signal after detection.

Other characteristics and advantages will appear from the description which is given as an example:

DESCRIPTION OF THE PREFERRED EMBODIMENT

Figure 1:
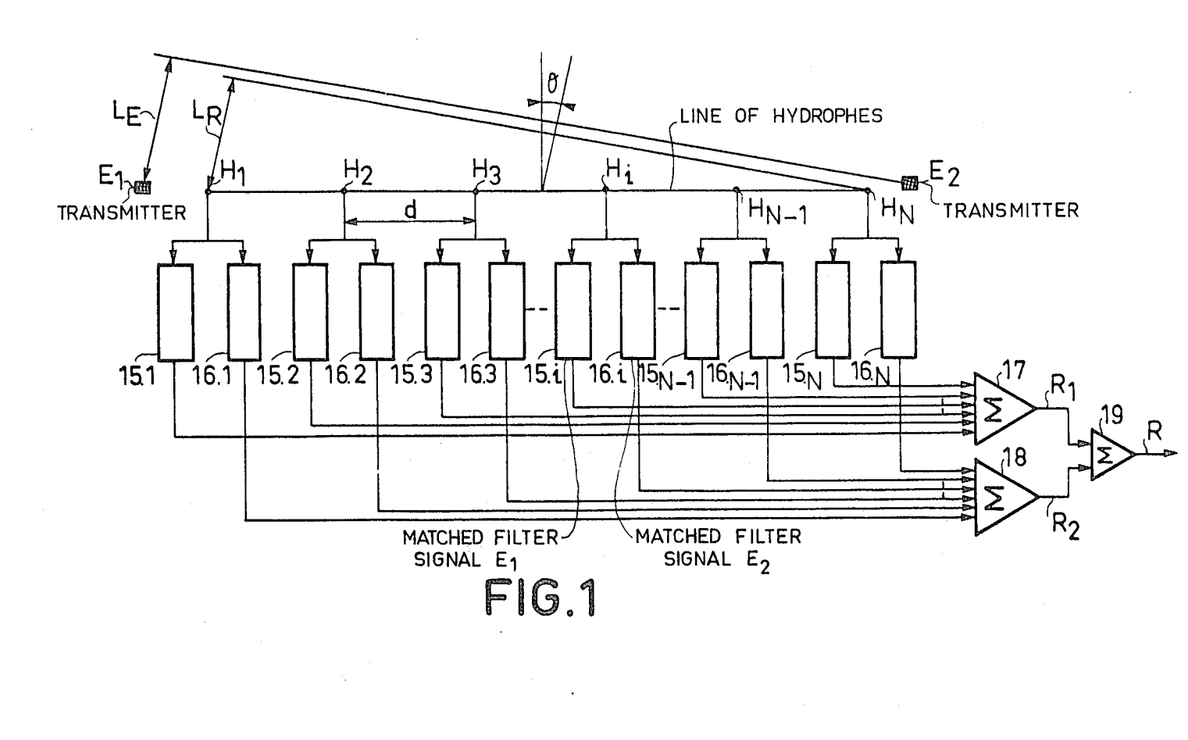
FIG. 1 the theoretical diagram of the acoustic display system in accordance with the invention, FIG. 2 the general diagram of the circuits processing the signals received by the hydrophones in accordance with the invention.

FIG. 1 shows an example of a linear array with several transmitters in accordance with the invention. The reception array contains N hydrophones $H_1, \ldots H_2, \ldots H_i, \ldots H_N$ spaced a distance d one from another which receive the echoes from all directions of the signals transmitted by two transmitters $E_1$ and $E_2$.

The two transmitters are placed in the array alignment and $N \times d$ apart. Preferably they are placed at the two ends of the reception array.

The two transmitters $E_1$ and $E_2$, transmit coded signals and the signals received by the hydrophones, $H_1, H_2, \ldots H_i, \ldots H_N$ are applied to filters such as 15.$i$ and 16.$i$ which are matched to the codes of the signals coming from $E_1$ and $E_2$ respectively.

The signals obtained at the output of filters 15.1, 15.2, ... 15.$i$, ... 15.N are added in adder 17 which supplies a signal $R_1$. In the same way, the signals at the output of filters 16.1, 16.2, ... 16.$i$, ... 16.N, after being added in circuit 18, supply a signal $R_2$ The two signals, $R_1$ and $R_2$, are then added to supply a resulting signal R.

In FIG. 1, the signals coming from a target in a direction making an angle $\theta$ with the normal to the antenna and transmitted in this direction by transmitter $E_2$ are received by each hydrophone such as $H_i$ at an amplitude $A_i$ and phase $\phi_i = (i-1) (2\pi d/\lambda) \sin \theta$ in which $\lambda$ is the wavelength and the phase origin is taken as that of the signals received by hydrophone $H_1$.

Signal $R_2$ can be written, to within a multiplying constant, with the complex notation:

$$R_2 = \sum_{i=1}^{N} A_i e^{j\phi_i} \qquad (1)$$

The signals transmitted in the same direction by transmitter $E_1$ are received by each hydrophone such as $H_i$ at an amplitude little different from $A_i$ and phase which is the sum of $\phi$ and a phase $\phi_E$ corresponding to the phase shift on transmission $\phi_E = (2\pi L_E/\lambda) = (2\pi Nd/\lambda) \sin \theta$ between the signals transmitted by $E_1$ and $E_2$ in a direction $\theta$ in which $L_E$ is the difference in step for the two transmitters.

With the same phase origin as before, this gives for signal $R_1$:

$$R_1 = \sum_{i=1}^{N} A_i e^{j(\phi_i + \phi_E)} = \sum_{i=N+1}^{2N} A_i e^{j\phi_i} \qquad (2)$$

After adding in circuit 19, from (1) and (2):

$$R = R_1 + R_2 = \sum_{i=1}^{2N} A_i e^{j\phi_i} \qquad (3)$$

From expression (3), the radiation diagram associated with signal R is such that:

$$R(\theta) \simeq \sin\left(\frac{2\pi Nd}{\lambda} \sin \theta\right) \bigg/ \frac{2\pi Nd}{\lambda} \sin \theta \qquad (4)$$

while from expression (1) or (2), the radiation diagram associated with signal $R_1$ or $R_2$ is such that:

$$R = (\theta) \simeq \sin\left(\frac{2\pi Nd}{\lambda} \sin \theta\right) \bigg/ \frac{2\pi Nd}{\lambda} \sin \theta \qquad (4)$$

while from expression (1) or (2) the radiation diagram associated with signal $R_1$ or $R_2$ is such that:

$$R_{1,2}(\theta) \simeq \sin\left(\frac{\pi Nd}{\lambda} \sin \theta\right) \bigg/ \frac{\pi Nd}{\lambda} \sin \theta \qquad (5)$$

The width of the main lobe at half the power $2 \theta_o$ given by expression (4) is half as large as that given by expression (5). In other words, the width $2 \theta_o$ obtained with two transmitters is equal to that which would have been obtained with a single transmitter and an array twice as long with 2 N hydrophones.

Transmitters $E_1$ and $E_2$ form a transmission array and they may be anywhere provided that their position with respect to the reception array is known.

By extension, a system which enables the width $2 \theta_o$ to be reduced, i.e. the resolution to be increased, without increasing the reception array dimensions, will contain a transmission array formed of several transmitters and a reception array formed by a hydrophone network.

With an array such as that shown in FIG. 1 which receives a plane sinusoidal wave, the distribution of the pressures received at a given instant by the N hydrophones is a sinusoid whose frequency is a function of the direction $\theta$. This property is used to form channels by making a Fourier transform of the signal resulting from the multiplexing of the N signals $h_1, \ldots h_N$ in a time interval which is very short with respect to the reciprocal of the band. Thus N signals are obtained representing the acoustic energy corresponding to N directions in the field of the spatial frequencies such that $f_s = (d/\lambda) \sin \theta$.

In FIG. 1 the propagation time corresponding to the distance $L_R$, which is the difference in step between the end hydrophones, i.e. $(N-1/cd) \sin \theta$ in which c is the wave speed, is called the array depth for a direction $\theta$. If the signals have a band B round a carrier frequency $f_o$, this band must be small with respect to the reciprocal of the array depth in the most inclined direction $\theta$. As d is inversely proportional to $f_o$, the ratio $B/f_o$ must be small.

In a system containing a reception array formed of N hydrophones in a line distanced d one from another and a transmission array formed of M transmitters in the line distant Nd one from another, it will be understood from the preceding information that it is possible to obtain an image which $M \times N$ points by placing in series end to end the M signals obtained after multiplexing for a transmitter of the N signals received by the N hydrophones, the frequency band of the signals transmitted being small compared with the reciprocal of the array depth in the most inclined direction, and making the Fourier transform of the resulting signal obtained.

Figure 2:
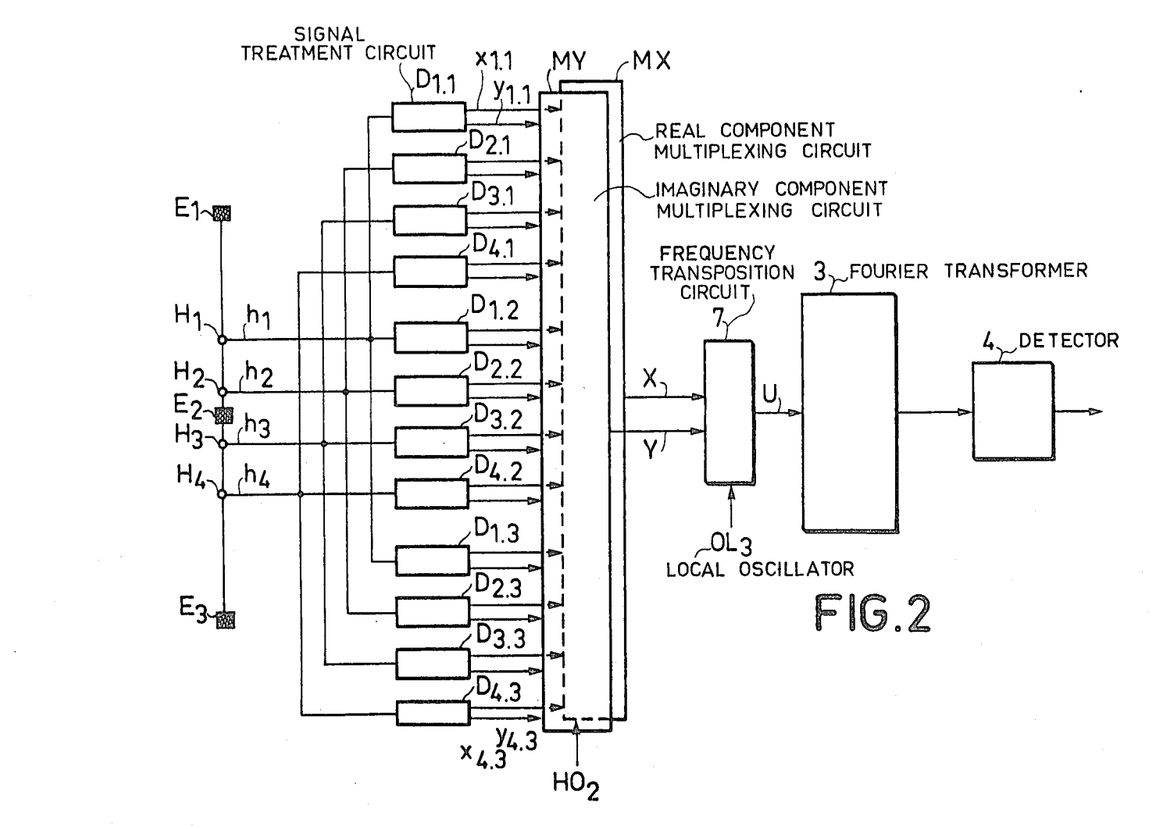

FIG. 2 shows a system supplying a line of image points, one point representing the acoustic energy coming from a direction obtained by a beam formed in this direction whose width corresponds to the array resolution. The reception array consists of N hydrophones $H_i$ distanced d one from another and the transmission array consists of M transmitters distanced Nd one from another and placed preferably along the line of transducers $H_i$. In the figure $N=4$ and $M=3$.

Transmitters $E_1$, $E_2$ and $E_3$ transmit signals in the form of pulses with the same center frequency $f_o$ and identical spectrum densities. These signals are coded by the transmitter so that they may be separated at the level of each hydrophone $H_i$. The carrier frequency $f_o$ is modulated, for example, by a sequence of $\Omega$ binary symbols each of which occupies a frequency band B such that $B<<f_o$. The length of each signal is T and the values of B and T are so chosen that the product BT is much bigger than the number of transmitters M. The binary sequences are orthogonally coded, Hence, a signal with a correlation peak is obtained at the output of a filter adapted to the code. A code with phase shift keying, or P.S.K., can be used, for example.

The electric signals $h_i$ supplied at an instant by each transducer such as $H_i$ are passed to M processing channels such as $D_{ik}$, in which $k \leq M$, each containing a correlator device intended to separate the various signals corresponding to each of the transmitters, these correlators doing the filtering matched to the codes of these transmitters.

Figure 3:
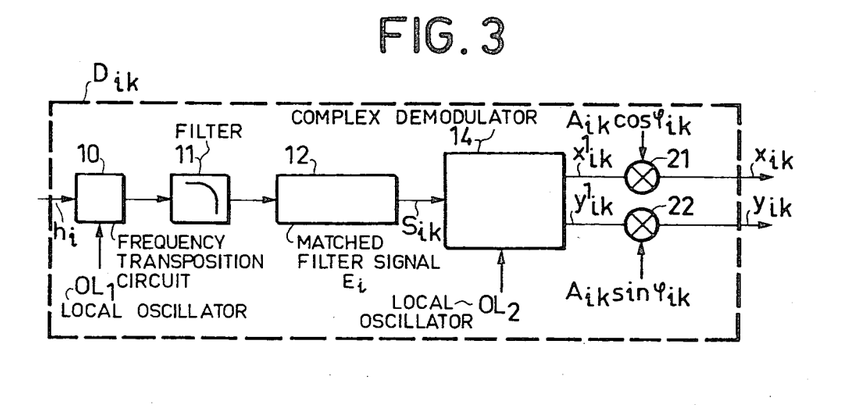
FIG. 3 is a schematic diagram of the production of one of the processing circuits, FIG. 4 a complex demodulation circuit, FIG. 5 a circuit adding the multiplexed signal to a carrier, FIGS. 6 and 7 schematic diagrams for the production of a Fourier transform by means of dispersive filters, FIG. 8 a side sweep array, FIG. 9 a 2-dimensional transmission-reception array, FIG. 10 a schematic diagram for the processing of a 2-dimensional array, FIG. 11 the placing in series of various multiplexed signals for a 2-dimensional array, FIG. 12 the schematic diagram for processing the multiplexed signals for a 2-dimensional array, FIG. 13 a circuit for decoding using charge transfer devices in accordance with the invention.

The schematic diagram of one way of producing a processing circuit $D_{ik}$ is shown in FIG. 3. The signal $h_i$, received by transducer $H_i$, is applied to a frequency changer circuit 10 which also receives the signal supplied by a local oscillator OL1. The signal changed in frequency is filtered by a low pass filter 11 and applied to a correlation circuit 12 matched to the signal emitted by transmitter $E_j$.

In a preferred embodiment, the correlation circuit such as 12 consists of a charge coupled device, called C.C.D., whose operation is similar to that of a shift register. Each correlator is adapted to a code transmitted and, for this code, a signal with a correlation peak is obtained at the output.

The analog signal supplied to each C.C.D. is sampled in time at the rate of the period $T_{HO1}$ of a signal from a clock HO1 of frequency $f_{HO1}$. If the C.C.D. register has K stages, the value of $T_{HO1}$ chosen is equal to T/K in which T is the duration of the pulse transmitted. Also, the frequency $f_i$ of the analog signal supplied must be such that $f_i < f_{HO1}/2$.

Figure 4:
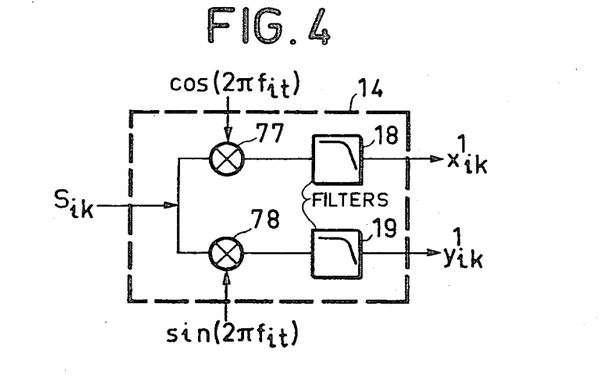

The correlation signal $S_{ik}$ is applied to a circuit 14 which performs the operation called complex demodulation shown schematically in FIG. 4. Signal $S_{ik}$ is multiplied by $\cos 2\pi f_i t$ on the one hand and by $\sin 2\pi f_i t$ on the other, in which $f_i$ is the carrier frequency of signal $S_{ik}$. After filtering by low pass filters 18 and 19, the components of the signal $x_{ik}^1$ and $y_{ik}^1$ are obtained. These components are multiplied in 21 and 22 by weighting values $A_{ik} \cos \theta_{ik}$ and $A_{ik} \sin \theta_{ik}$ respectively in the multiplier circuits supplying the signal components $x_{ik}$ and $y_{ik}$ (FIG. 3).

At the output of processing channels such as $D_{ik}$ $M \times N$ complex signals $x_{ik}$, $y_{ik}$ are obtained (FIG. 2). Signals $x_{ik}$ and $y_{ik}$ are applied to multiplexing circuits MX and MY respectively at the rate of a clock $H_{02}$ whose period $T_{HO2}$ is chosen small with respect to the reciprocal of the signal band.

The multiplexing order is such that the X and Y signals obtained follow in an order such that $x = x_{11}, x_{21}, \ldots x_{N1}, \ldots x_{1M}, x_{2M}, \ldots x_{NM}$.

Figure 5:
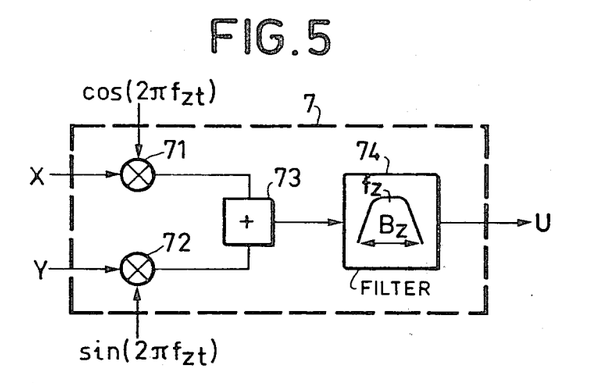

The order is the same for the Y signals. The X and Y signals are applied to a circuit 7 which places them on a carrier at a frequency $f_z$ supplied by a local oscillator OL3. Circuit 7 is shown schematically in FIG. 5. The X and Y signals are multiplied by $\cos(2\pi f_z t)$ and $\sin(2\pi f_z t)$ respectively in 71 and 72 and added in circuit 73. Finally the signal obtained is filtered round the new carrier frequency $f_z$ by filter 74 of band $B_z$ which supplies a signal U. This signal U is applied to a circuit 3 which makes the Fourier transform in analog fashion very rapidly by means of filters dispersive to elastic waves. After detection by circuit 4 the output signal obtained corresponds to a line of image points.

In accordance with the invention, the value of the frequency $f_z$ of local oscillator OL3 is chosen to enable the signal to be processed later in filters dispersive to elastic waves. It is of the order of several tens of MHz.

Figure 6:
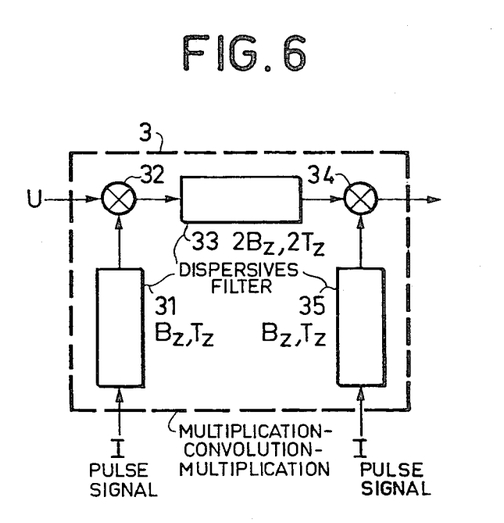
Figure 7:
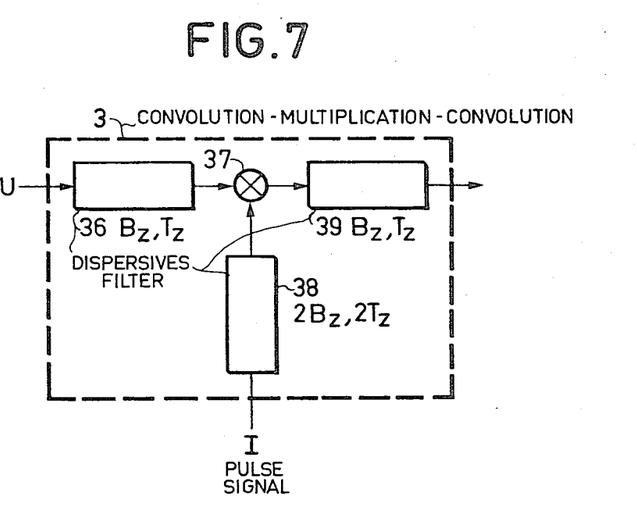

The signal U supplied by circuit 7 at carrier frequency $f_z$ of duration $T_z = M \times N \times T_{HO2}$ and with band $B_z$, which is a function of the multiplexing frequency $f_{HO2}$, is passed to Fourier transform circuit 3, which uses filters dispersive to elastic waves and is shown in FIGS. 6 and 7 representing two methods of embodiment.

The first embodiment, in FIG. 6, is an assembly called a multiplication-convolution-multiplication, or M-C-M, circuit in which successive signals U can be passed without being separated in time. In this assembly signal U is premultiplied in a circuit 32 by a signal called a "ramp" which is modulated linearly in frequency with band $B_z$ of length $T_z$. To obtain this signal a very short pulse I is fed to the input of a dispersive filter 31. At the output of multiplier 32 the signal is passed to a dispersive filter 33 with band $2B_z$ of length $2T_z$. At the output the signal is postmultiplied in 34 by a ramp signal identical to the preceding one which is generated by dispersive filter 35. If the signal phase is not useful, this postmultiplication can be eliminated and replaced by detection carried out in 4 (FIG. 2). However, with this assembly it is not possible to weight output filter 33 to improve the analysis.

The second production method, in FIG. 7, is an assembly called a convolution-multiplication-convolution, or C-M-C-, circuit in which successive signals U must be passed in sequence separated by a time interval $T_z$, the length of signal U. On the other hand, dispersive output filter 39 can be weighted.

In this assembly signal U is first convoluted in a dispersive filter 36 with band $B_z$ of length $T_z$ and then multiplied in 37 by a ramp signal supplied by a dispersive filter 38 with band $2B_z$ of length $2T_z$. At the output of multiplier 37 the signal is passed to dispersive filter 39 which is identical to filter 37. If the signal phase is not useful, the first convolution filter 36 can be eliminated and the output signal detected in 4.

The present invention can be used with advantage with Sonar type apparatuses to obtain an image of the sea bottom.

Figure 8:
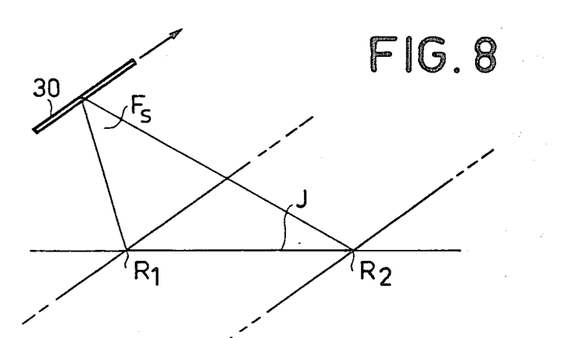

As shown schematically in FIG. 8 in the case of a side-scan sonar, a beam $F_S$ if formed by an array 30 to illuminate the bottom obliquely so that a line of image points J is formed in the time interval separating 2 echoes coming from points $R_1$ and $R_2$, the image being formed by the forward motion of the vehicle. Several beams can also be formed in the direction of the vehicle motion; the Sonar is then of the frontal type.

In an example of production in accordance with the invention, the system contains a transmission array with 3 transmitters and a reception array with 96 hydrophones, the arrays being arranged as indicated in FIG. 2. The signals transmitted in the form of coded pulses in a band B round the same center frequency $f_o$ have the following characteristics. $f_o = 200$ kHz, $B = 6$ kHz and $T = 22.4$ ms The values of the frequencies of the various oscillators and clock signals are: $f_{OL1} = 194.3$ kHz, $F_{HO1} = 22.85$ kHz, $f_i = f_{OL2} = 5.7$ kHz, $f_{HO2} = 12$ MHz and $f_z = f_{OL3} = 30$ MHz.

Each correlator 12 is a C.C.D. consisting of 512 stages. When the preceding values are taken into account, band $B_z$ is 12 MHz and length $T_z$ about 25 μsec.

The hydrophones are 2 wavelengths apart and the overall size of the reception array is about 1.5 m. The angular resolution obtained is close to 0.1°, the same as for a reception array 4.5 m long.

Thanks to the high operation speeds which are obtained with the filters dispersive to elastic waves, a line of 288 image points is obtained in a time interval of the order of 25 μsec, which is much less than 1/B.

If a digital technique with a computer whose calculating time for a butterfly operation is 1 μsec had been used, the same line of image points would have been obtained in about 1.2 msec which is greater than 1/B and makes this technique inapplicable in this specific case.

Figure 9:
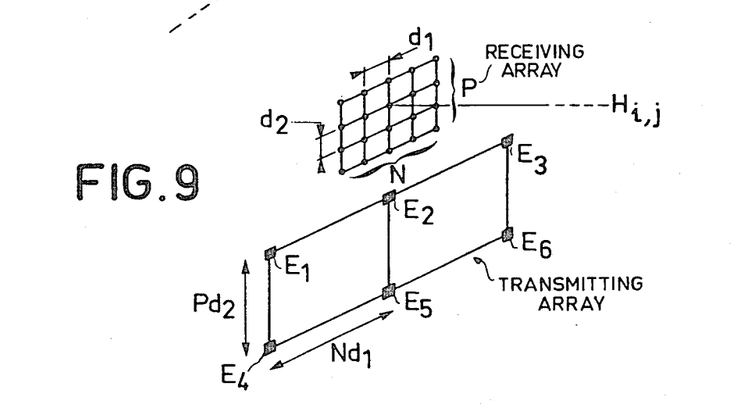

In apparatuses used for frontal imaging, the image obtained is formed of image points, each point corresponding to two directions along the horizontal and vertical axes. Their operation is identical to that of a camera and requires the use of arrays in two dimensions. In FIG. 9, the system contains a reception array formed of P equidistant lines of N equidistant hydrophones and a transmission array formed of L equidistant lines of N equidistant hydrophones. If the rectangular net formed by 4 reception transducers, $H_{i,j}$, $H_{i,j+1}$, $H_{i+1,j}$ and $H_{i+1,j+1}$, has a dimensions $d_1$ and $d_2$ respectively between transducers in the same line and between lines, the rectangular net formed by 4 transmitters has as dimensions $Nd_1$ and $Pd_2$ respectively between transmitters in the same line and between lines. The total number of transmitters is M.

Each transmitter, as in the preceding case, supplies a signal of duration T which is coded with a code orthogonal to the codes of the other transmitters, the transmissions being simultaneous.

Figure 10:
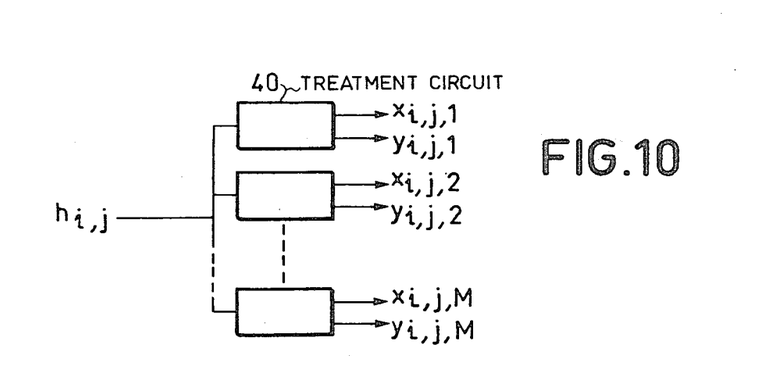

Each hydrophone supplies a signal $h_{i,j}$ corresponding to the $i^{th}$ transducer and the $j^{th}$ line. This signal is passed to M processing channels. Each channel has a circuit 40 similar to circuit $D_{ik}$ in FIG. 3. At the output signals $x_{i,j,k}$ and $y_{i,j,k}$ are obtained in which k varies from 1 to M (FIG. 10). These signals are multiplexed to form the signals $X_{j,k}$ and $Y_{j,k}$. $X_{j,k} = x_{1,j,k}, x_{2,j,k}, \ldots x_{N,j,k}$. These are the signals received by the transducers in line j from the transmitter numbered k.

In the same way a multiplexed signal $Y_{j,k}$ is obtained for the signals $x_{i,j,k}$.

Figure 11:
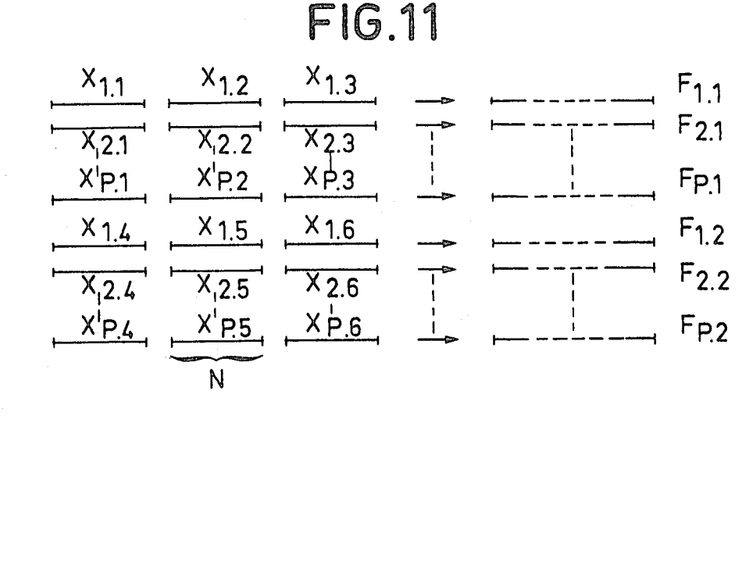

These signals are grouped together to be so processed as to form an image. FIG. 11 explains the way in which the grouping is done for signals $X_{j,k}$ in the case in which the transmission array has 2 lines with 3 transmitters in each such as the array shown in FIG. 9. The signals are read sequentially and placed in series, end to end by line of hydrophones and line of transmitters. Thus, the signal $F_{1,i}$ is formed by the signals in the first line of hydrophones coming from transmitters $E_1$, $E_2$ and $E_3$ placed in series end to end. Each signal $X_{j,k}$ or $Y_{j,k}$ is $NT_{HO2}$ long when N is the number of hydrophones per line and $T_{HO2}$ the period of the clock signal which controls all the multiplexer circuits.

When the P lines of hydrophones have supplied P signals $F_{j,1}$ corresponding to the first line of transmitters, the same grouping is done for the second line fo transmitters, $E_4$, $E_5$ and $E_6$, supplying P signals $F_{j,2}$.

Generally, for a number of transmitter lines L, the number of signals $F_j$ supplied is equal to $P \times L$ and their duration is $Q \times N \times T_{HO2}$ for Q transmitters per line. In the same way, $P \times L$ signals $G_j$, are obtained from signals $Y_{j,k}$. Each pair of signals, $F_j$, and $G_j$, is passed to a complex modulator identical to that shown in FIG. 4, the frequency $f_z$ being adapted to the use of filtered dispersive to elastic waves while band $B_z$ is equal to the multiplexing frequency of signals $x_{i,j,k}$ and $y_{i,j,k}$. Signals $U_j$, are obtained which are passed in sequence to a surface wave, bidimensional Fourier transformer show in FIG. 6.

This transformer consists mainly of two monodimensional Fourier transformers 60 and 67, whose structure is identical to that of transformer 3 in FIG. 7, and an intermediate digital memory 64 in which the data are entered in line and from which they are brought out in columns. It may be noted that this technique is known in prior art.

Each analog signal $U_{j,l}$ of duration $T_z = Q \times N \times T_{HO2}$ with center frequency $f_z$ and band $B_z$ is processed in the first Fourier transformer 60. The signal is then demodulated with frequency $f_z$ by circuit 61 which is identical to the one shown in FIG. 4. In a preferred embodiment of the invention, the so-called real and imaginary parts obtained then undergo logarithmic compression in 62.1 and 62.2. This enables the number of bits in the digital conversion carried out in 63.1 and 63.2 for n bits to be reduced. They are then stored in 2 random access memories, RAMs, 64.1 and 64.2. The storage is done sequentially in such a way that each signal $U_{j,l}$ corresponds to a line in the memory where each line contains $N \times Q$ samples of n bits.

When all the lines, $L \times P$, have been stored in the memory, the samples are read sequentially column by column to supply signals V and W corresponding to each column of each memory 64.1 and 64.2. These signals are converted to analog ones by converters 65.1 and 65.2 and then undergo logarithmic expansion, the reverse of compression, in circuits 66.1 and 66.2. They are then modulated round the carrier $f_z$ by circuit 67 which is identical to the one shown in FIG. 5.

If the samples in each column are read at the rate of a signal of a clock HO3 of period $T_{HO3}$, the duration of the signal z obtained is $L \times P \times T_{HO3}$. The $L \times P$ signals Z are processed sequentially by a second Fourier transformer 68 of the same structure as the first one.

After detection by circuit 69, the signals obtained from the image in two dimensions.

With advantage, the transmission and reception arrays are square, i.e $L = Q$ and $P = N$. The durations of signals $U_{j,l}$ and Z are equal when $T_{HO3}$ is chosen equal to $T_{HO2}$ and the two Fourier transformers 60 and 68 are identical with dispersive filters with the same delay times.

In this system the rate of obtaining lines of image points is not limited to the reciprocal of the band of the signal transmitted. If suffices that this rate be that of the line sweep in the cathode ray tube used.

The present invention is applied in particular in underwater acoustics to apparatuses of the camera type with a range of the order of a few meters, the signal frequency being of the order of a Megahertz.

In an example of production the system supplies an image with 96×96 points with the following characteristics:
- transmission array formed by 4 transmitters;
- reception array formed by 48×48 receivers 2 wavelengths one from another;
- transmission carrier frequency: 2 MHz.

With advantage, the 4 transmitters are placed at the 4 corners of the reception array so that the array size is 7.5 cm×7.5 cm. The angular resolution corresponding to each point is 0.3°, the same as for a reception array with a surface twice as big and containing 96×96 receivers.

The signals are multiplexed at the frequency $f_{HO2}=4$ MHz and the characteristics of the dispersive filters in the Fourier transformers are: $B_z=4$ MHz, $T_z=25$ μsec and $f_z=10$ MHz. Digital conversion of the signals is fone for 8 bits for example.

With this system it is possible to process an image in a time of the order of 5 msec which corresponds to a field depth of 7.5 m.

Figure 13:
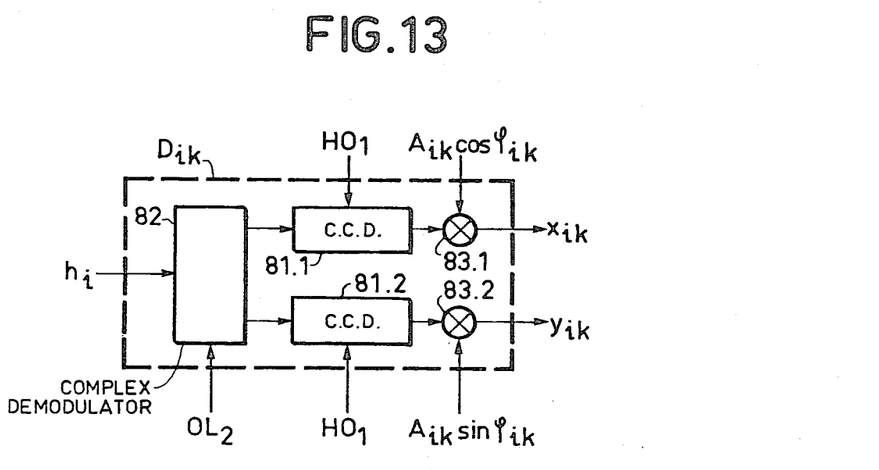

In a variant of the invention the processing circuits such as $D_{ik}$ in FIG. 2 and the circuits such as 40 in FIG. 10 are made as shown in FIG. 13. The signal such as $h_i$ supplied by transducer $H_i$ first undergoes complex demodulation in circuit 82 by local oscillator OL2. The components of this demodulation are applied to C.C.D circuits which perform the filtering matched to the transmitter code for the real and imaginary parts. These circuits are followed by two weighting circuits 83.1 and 83.2. Signals $x_{ik}$ and $y_{ik}$ coming from the assembly of channels $D_{ik}$ for each transmitters are then multiplexed sequentially in time by two registers with C.C.D.s, which are not shown, the frequency of whose clock HO2 is at least N times higher than the frequency of clock HO1 in registers 81.1 and 81.2, where N is the number of signals multiplexed.

Signals $x_{ik}$ and $y_{ik}$ are fed in parallel to the inputs of the C.C.D. register and are delivered at the output in the form of a series of analog samples at the rate of clock HO2. Demodulation circuit 82 is identical to the one shown in FIG. 4 in which frequency $f_i$ is here equal to $f_o$, the centre transmission frequency. It may be noted that the maximum frequency of the signals at the output of demodulation circuit 82 is lower than in the preceding model so that the number of stages in each C.C.D. register is also smaller for the same length of transmitted signals.

Figure 12:
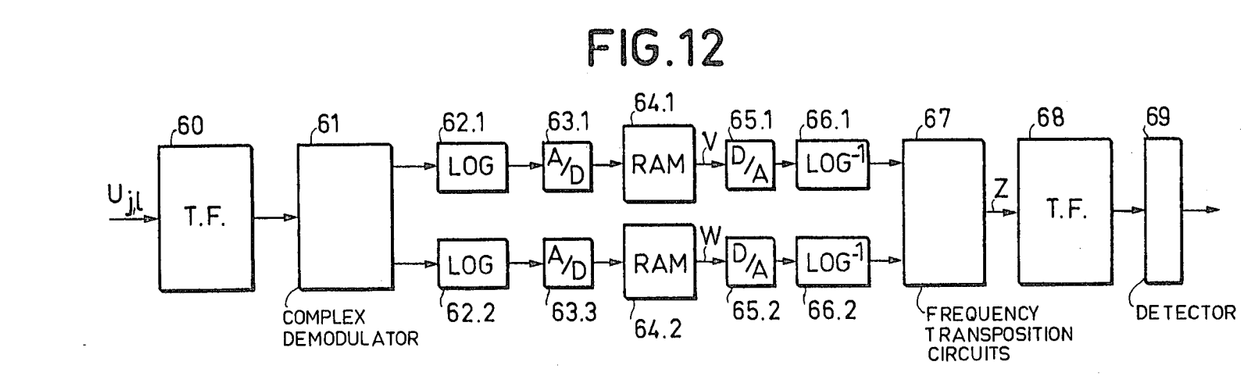

In another variant of the invention, the storage memories 64.1 and 64.2 in FIG. 12 are formed by a series of shift registers of the C.C.D. type whose number is equal to the number of lines. The signals obtained after the first acoustic Fourier transform are passed sequentially to each of the registers whose clock frequency is at least twice to carrier frequency. Then the shift in parallel, section by section, of all the registers filled enables the signals corresponding to the columns to be obtained.

In the case in which the transmission and reception arrays are square, in another variant of the invention, the bidimensional Fourier transform shown in FIG. 12 may use only one monodimensional Fourier transform multiplexed in time.

Finally, the examples given are such that the transmission array consists of a number of transmitters less than the number of hydrophones in the reception array, i.e $M<N$. The system operates in the same way if the transmission and reception functions are interchanged, which comes to having $M>N$.

What we claimed is:

1. An acoustic imaging system comprising:
    a transmission rectangular array of M transmitting transducers such as $E_K$, where $1 \leq k \leq M$;
    a receiving rectangular array having N lines of P hydrophones $H_{i,j}$, where $1 \leq i \leq P$ and $1 \leq j \leq N$, said lines being parallel to the lines of said transmission array of M transmitting transducers, the distances between adjacent hydrophones in the lines and in the columns being respectively $d_1$ and $d_2$, wherein the distances between adjacent said transmitting transducers are $Nd_1$ and $Pd_2$ respectively in the lines and in the columns in said transmission rectangular array;
    energizing circuit means for energizing said transmitting transducers by supplying code modulated signals with the same central frequency, each said transmitting transducer $E_k$ transmitting with a different code, said codes being orthogonal one to the other;
    M processing circuits receiving the output of said hydrophones and including a correlation means receiving and decoding said code modulated signals in order to provide decoded signals and outputting signals $X_{i,j,l}, \ldots X_{i,j,k}, \ldots X_{i,j,M}$ and $Y_{i,j,l} \ldots Y_{i,j,k}, \ldots Y_{i,j,m}$ for respectively the real and imaginary components of each of said decoded signals;
    multiplexing means for receiving said decoded signals and multiplexing separately said real and imaginary components, and providing a multiplexing sequence of signals corresponding to the signals of a hydrophone line j in succession, for the transmitters of the same line 1; and
    a carrier being supplied with said multiplexing sequences of signals and outputting signals $U_{j,i}$ which are applied to a two-dimensional Fourier transform analog device.

2. An imaging system as claimed in claim 1 wherein said multiplexing means are charge coupled devices.

3. An imaging system as claimed in claim 1 wherein said Fourier transform analog device comprises a dispersive filter device receiving said signals $U_{j,i}$;
    a complex demodulator for demodulating the components of the output of said dispersive filter;
    analog-digital converter for converting the output of said demodulator;
    random access memory means for storing the output of said analog-digital converter and for supplying signals in columns;
    digital-analog converter for converting the output from said random access memories into an analog format;
    carrier means for supplying a carrier frequency and for adding the output of said digital-analog converter onto said carrier frequency;

a second Fourier transform device for transforming the output of said carrier means; and detector means for detecting the output of said second Fourier transformer device and supplying image lines in succession.

4. An imaging system as claimed in claim 3, wherein the Fourier transform devices each contain two dispersive filters of duration $T_z$ with pass band $B_z$ and a third dispersive filter of length $2Y_z$ with pass band $2B_z$.

* * * * *